US006259439B1

(12) United States Patent
Lippincott

(10) Patent No.: US 6,259,439 B1
(45) **Date of Patent: *Jul. 10, 2001**

(54) COLOR LOOKUP TABLE BLENDING

(75) Inventor: Louis A. Lippincott, Roebling, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/119,790

(22) Filed: Jul. 21, 1998

Related U.S. Application Data

(63) Continuation of application No. 08/755,714, filed on Nov. 25, 1996, now Pat. No. 5,852,444, which is a continuation of application No. 08/425,709, filed on Apr. 19, 1995, now abandoned, which is a continuation of application No. 07/986,220, filed on Dec. 7, 1992, now abandoned.

(51) Int. Cl.[7] ..... G09G 5/06; H04N 11/12; H04N 9/74

(52) U.S. Cl. ..... 345/199; 384/492; 384/597

(58) Field of Search ..... 345/131, 133, 345/147, 150, 151, 152, 153, 154, 155, 199; 348/492, 563, 564, 589, 597, 598

(56) References Cited

U.S. PATENT DOCUMENTS 4,580,158 4/1986 Macheboeuf ..... 358/22
4,743,959 5/1988 Frederiksen ..... 358/11
4,775,858 10/1988 Stapelton et al. ..... 340/742

(List continued on next page.)

OTHER PUBLICATIONS

Desor, Single–Chip Video Processing System, IEEE Transactions on Consumer Electronics, Aug. 1991, pp. 182–189.

Rantanen et al., Color Video Signal Processing with Median Filters, IEEE Transactions on Consumer Electronics, Aug. 1992, pp. 157–161.

Foley et al., Computer Graphics: Principles and Practice, 1990, pp. 835–850, 1990.

IBM Technical Disclosure Bulletin, vol. 37, No. 03, Mar. 1994, Armonk, New York, US, pp. 95–96. XP 000441392 "Direct–to–Palette Dithering."

IBM Technical Disclosure Bulletin, vol. 33, No. 5, Oct. 1990, Armonk, New York, US, pp. 200–205. XP 000107434 "Default RGB Color Palette with Simple Conversion from YUV."

*Primary Examiner*—William A. Cuchlinski, Jr.
*Assistant Examiner*—Thu Nguyen
(74) *Attorney, Agent, or Firm*—Duane, Morris & Heckscher LLP

(57) ABSTRACT

In the system of the present invention an individual displayed pixel is a weighted combination of a video pixel and a graphics pixel. For example, a pixel displayed on a monitor may be three-quarters graphics and one-quarter video. In this system a color lookup table providing a red, a green and a blue lookup table output value is extended to provide a further lookup table output value. The further lookup table output value is a weight value representative of the relative weights of a video pixel and a corresponding graphics pixel. The weight value is applied to a matrix multiplier which also receives video pixel information and graphics pixel information. The matrix multiplier determines a weighted combination of the video and graphics pixel information according to the weight value to provide a blended pixel. A YUV standard to RGB standard conversion matrix is provided within in order to receive video signals in a YUV format and apply the video signals to the matrix multiplier in an RGB format.

28 Claims, 2 Drawing Sheets

U.S. PATENT DOCUMENTS

| | | | | |
|---|---|---|---|---|
| 4,833,524 | | 5/1989 | Wischermann | 358/22 |
| 4,849,746 | | 7/1989 | Dubner | 340/728 |
| 4,857,992 | | 8/1989 | Richards | 358/13 |
| 4,991,122 | | 2/1991 | Sanders | 364/521 |
| 5,003,491 | | 3/1991 | Heckt | 345/114 |
| 5,068,644 | | 11/1991 | Batson et al. | 340/701 |
| 5,099,331 | | 3/1992 | Truong | 358/183 |
| 5,124,688 | | 6/1992 | Rumball . | |
| 5,138,303 | | 8/1992 | Rupel | 340/703 |
| 5,138,307 | | 8/1992 | Tatsumi | 340/721 |
| 5,142,273 | | 8/1992 | Wobermin | 340/703 |
| 5,204,664 | | 4/1993 | Hamakawa | 340/703 |
| 5,218,431 | | 6/1993 | Gleicher et al. | 358/13 |
| 5,218,432 | | 6/1993 | Wakeland | 358/22 |
| 5,220,410 | | 6/1993 | Wakeland et al. | 358/13 |
| 5,227,863 | | 7/1993 | Bilbrey et al. | 358/22 |
| 5,230,041 | | 7/1993 | Dinwiddie, Jr. et al. | 395/162 |
| 5,231,385 | | 7/1993 | Gengler et al. | 340/703 |
| 5,233,684 | | 8/1993 | Ulichney | 395/131 |
| 5,243,447 | | 9/1993 | Bodenkamp et al. | 345/133 |
| 5,245,322 | | 9/1993 | Dinwiddie, Jr. et al. | 345/113 |
| 5,258,826 | | 11/1993 | Wakeland et al. | 358/12 |
| 5,260,695 | | 11/1993 | Gengler et al. | 345/153 |
| 5,280,397 | | 1/1994 | Rhodes | 360/36.2 |
| 5,325,215 | | 6/1994 | Shibata et al. | 358/479 |
| 5,329,292 | | 7/1994 | Nishioka et al. | 345/199 |
| 5,341,442 | | 8/1994 | Barrett | 382/56 |
| 5,345,541 | | 9/1994 | Kelley et al. | 395/126 |
| 5,347,618 | | 9/1994 | Akeley | 395/121 |
| 5,351,067 | | 9/1994 | Lumelsky et al. | 345/191 |
| 5,381,180 | | 1/1995 | Keith | 348/396 |
| 5,384,582 | | 1/1995 | Keith et al. | 345/199 |
| 5,406,310 | | 4/1995 | Aschenbrenner et al. | 345/150 |
| 5,414,529 | | 5/1995 | Terada et al. | 358/448 |
| 5,416,614 | | 5/1995 | Crawford | 358/530 |
| 5,428,465 | | 6/1995 | Kanamori et al. | 358/518 |
| 5,428,720 | | 6/1995 | Adams, Jr. | 395/131 |
| 5,430,465 | | 7/1995 | Sabella et al. | 345/199 |
| 5,450,098 | | 9/1995 | Oz | 345/154 |
| 5,572,235 | * | 11/1996 | Mical et al. | 345/150 |
| 5,786,908 | * | 7/1998 | Liang | 358/518 |

* cited by examiner

COLOR LOOKUP TABLE BLENDING

This application is a continuation of application Ser. No. 08/755,714 filed on Nov. 25, 1996, now U.S. Pat. No. 5,852,444, which is a continuation of application Ser. No. 08/425,709 filed on Apr. 19, 1995, now abandoned, which is a continuation of application Ser. No. 07/986,220 filed on Dec. 7, 1992, now abandoned.

FIELD OF THE INVENTION

This invention relates to the field of video processing and in particular to the use of color lookup tables in the field of video processing.

BACKGROUND ART

Several formats have been presented for storing pixel data in a video subsystem. One approach is to provide twenty four bits of RGB information per pixel. This approach yields the maximum color space required for video at the cost of three bytes per pixel. Depending on the number of pixels in the video subsystem, the copy/scale operation could be overburdened by this.

A second approach is a compromise with the twenty four bit system. This approach is based on sixteen bits of RGB information per pixel. Systems of this nature require fewer bytes for the copy/scale operation but have the disadvantage of less color depth. Additionally, since the intensity and color information are encoded in the R, G and B components of the pixel, this approach does not take advantage of the human eye's sensitivity to intensity and insensitivity to color saturation. Other sixteen bit systems have also been proposed in which the pixels are encoded in a YUV format such as 6, 5, 5 and 8, 4, 4. Although these systems are somewhat better than the sixteen bit RGB approach, the sixteen bit YUV format does not come close to the performance of twenty bit systems.

Eight bit color lookup tables provide a third approach to this problem. This method uses eight bits per pixel as an index into a color map that typically has twenty bits of color space. This approach has the advantages of low byte count and while still providing twenty bit color space. However, there are only two hundred fifty six colors available on the screen in this approach and image quality may be somewhat poor.

Dithering techniques that use adjacent pixels to provide additional colors have been demonstrated to have excellent image quality, event for still images. However, these dithering techniques often require complicated algorithms and specialized palette entries in the digital-to-analog converter as well as almost exclusive use of the color lookup table. The overhead of running the dithering algorithm must be added to the copy/scale operation.

Motion video in some prior art systems is displayed in a 4:1:1 format called the "nine bit format". The 4:1:1 notation indicates that there are four Y samples horizontally for each UV sample and four Y samples vertically for each UV sample. If each sample is eight bits then a 4×4 block of pixels uses eighteen bytes of information or nine bits per pixel. Although image quality is quite good for motion video the nine bit format may be unacceptable for display of high-quality stills. In addition, it was found that the nine bit format does not integrate well with graphics subsystems. Other variations of the YUV subsampled approach include an eight bit format.

Systems integrating a graphics subsystem display buffer with a video subsystem display buffer generally fall into two categories. The two types of approaches are known as single frame buffer architectures and dual frame buffer architectures. The single frame buffer architecture is the most straightforward approach and consists of a single graphics controller, a single digital-to-analog converter and a single frame buffer. In its simplest form, the single frame buffer architecture represents each pixel on the display by bits in the display buffer that are consistent in their format regardless of the meaning of the pixel on the display. Thus, graphics pixels and video pixels are indistinguishable in the frame buffer RAM. However, the single frame buffer architecture graphics/video systems, i.e. the single frame buffer architecture visual system, does not address the requirements of the video subsystem very well. Full screen motion video on the single frame buffer architecture visual system requires updating every pixel in the display buffer thirty times every second. In a typical system the display may be on the order of 1280×1024 by 8 bits. Even without the burden of writing over 30 M Bytes per second to the display buffer, it has been established that eight-bit video by itself does not provide the required video quality. This means the single frame buffer architecture system can either move up to sixteen bits per pixel or implement the eight bit YUV subsampled technique. Since sixteen bits per pixel will yield over 60 M Bytes per second into the frame buffer, it is clearly an unacceptable alternative.

A visual system must be able to mix video and graphics together on a display which requires the display to show on occasion a single video pixel located in between graphics pixels. Because of the need to mix video and graphics within a display every pixel in the display buffer must be a stand-alone, self-sustaining pixel on the screen. The nature of the eight bit YUV subsampled technique makes it necessary to have several eight bit samples before one video pixel can be generated, making the technique unsuitable for the single frame buffer architecture visual system.

The second category of architecture which integrates video and graphics is the dual frame buffer architecture. The dual frame buffer architecture visual system involves mixing two otherwise free-standing single frame buffer systems at the analog back end with a high-speed analog switch. Since the video and graphics subsystems are both single frame buffer designs each one can make the necessary tradeoffs in spatial resolution and pixel depth with almost complete disregard for the other subsystem. Dual frame buffer architecture visual systems also include the feature of being loosely-coupled. Since the only connection of the two systems is in the final output stage, the two subsystems can be on different buses in the system. The fact that the dual frame buffer architecture video subsystem is loosely-coupled to the graphics subsystem is usually the overriding reason such systems, which have significant disadvantages, are typically employed.

Dual frame buffer architecture designs typically operate in a mode that has the video subsystem genlocked to the graphics subsystem. Genlocked in this case means having both subsystems start to display their first pixel at the same time. If both subsystems are running at exactly the same horizontal line frequency with the same number of lines, then mixing of the two separate video streams can be done with very predictable results.

Since both pixel streams are running at the same time, the process can be thought of as having video pixels underlaying the graphics pixels. If a determination is made not to show a graphics pixel, then the video information will show through. In dual frame buffer architecture designs, it is not necessary for the two subsystems to have the same number of horizontal pixels. As an example, it is possible to have 352 video pixels underneath 1024 graphics pixels.

The decision whether to show the video information or the graphics information in dual frame buffer architecture visual systems is typically made on a pixel by pixel basis in the graphics subsystem. A technique often used is called chroma keying. Chroma keying involves detecting a specific color in the graphics digital pixel stream or a specific color entry in the color lookup table. Another approach uses the graphics analog pixel stream to detect black, since black is the easiest graphics level to detect. This approach is referred to as black detect. In either case, keying information is used to control the high-speed analog switch and the task of integrating video and graphics on the display is reduced to painting the keying color in the graphics display where video pixels are desired.

There are several disadvantages to dual frame buffer architecture visual systems. The goal of high-integration is often thwarted by the need to have two separate, free-standing subsystems. The cost of having duplicate digital-to-analog converters, display buffers, and cathode ray tube controllers is undesirable. The difficulty of genlocking and the cost of the high-speed analog switch are two more disadvantages. In addition, placing the analog switch in the graphics path will have detrimental effects on the quality of the graphics display. This becomes a greater problem as the spatial resolution and/or line rate of the graphics subsystem grows.

A digital-to-analog converter is a key component in these visual frame buffer architectures. The digital-to-analog converter of these architectures accept both YUV color information and RGB color information simultaneously and provides chroma keying according to the received color information. In the prior art chroma keying systems a decision is made for each pixel of a visual display, whether to display a pixel representative of the YUV color value or a pixel representative of the RGB color value. The RGB value within a chroma keying system is typically provided by a graphic subsystem. The YUV value within a chroma keying system is typically provided by a video subsystem.

In these conventional chroma keying systems the determination regarding which pixel is displayed is based upon the RGB color value. Thus in a single display image there may be a mixture of pixels including both YUV pixels and RGB pixels. Thus it will be understood that each pixel displayed using conventional chroma keying systems is either entirely a video pixel or entirely a graphics pixel. Chroma keying merely determines which to select and provides for the display of one or the other. "Visual Frame Buffer Architecture", U.S. patent application Ser. No. 870,564, filed by Lippincott, and incorporated by reference herein, teaches a color lookup table method. In this method an apparatus for processing visual data is provided with storage for storing a bit plane of visual data in a one format. A graphics controller is coupled to the storage by a data bus and a graphics controller and the storage are coupled through a storage bus. Further storage is provided for storing a second bit plane of visual data in another format different from the first format. The further storage is coupled to the graphics controller by a data bus. The second storage is also coupled to the graphics controller through the storage bus. The method taught by Lippincott also merges a pixel stream from visual data stored on the first storage means and visual data stored on the further storage means. The merged pixel stream is then displayed.

Also taught in Lippincott is an apparatus for processing visual data including a first storage for storing a first bit plane of visual data in a first format. A graphics controller is coupled to the first storage means by a data bus, and the graphics controller and the first storage are coupled through a storage bus. A second storage for storing a second bit plane of visual data in a second format different from said first format is also provided. The second storage is coupled to the graphics controller by the data bus. The second storage is also coupled to the graphics controller through the storage bus. A merged pixel stream is formed from visual data stored on the first storage and visual data stored on the second storage. However this system is also adapted to provide only individual pixels which are entirely graphics or entirely video.

Referring now to FIG. 1, there is shown prior art visual frame buffer system 10. In visual frame buffer system 10 eight bit graphics pixels are received by way of YUV system input line 28 and applied to color lookup tables 32*a–c* within buffer system memory 30. Color lookup tables 32*a–c* typically contain two-hundred and fifty-six by eight bit maps. Within buffer system memory 30 of system 10 the pixel values accessed from table 32*a* are dedicated to red, the pixel values accessed from table 32*b* are dedicated to green, and the values accessed from table 32*c* are dedicated to blue.

It will be understood by those skilled in the art that a table lookup in buffer system memory 30, using an eight bit input pixel value, yields an eight bit table output value from each lookup table 32*a–c*. Thus a total of twenty four bits of graphics RGB information is provided from buffer system memory 30 onto RGB multiplexer input line 34 of pixel multiplexer 18. This permits simultaneously obtaining two-hundred fifty-six colors from graphics that are essentially twenty-four bits deep.

Pixel multiplexer 18 receives another twenty-four bits of RGB information within visual frame buffer system 10. This further twenty-four bits of RGB information is video information converted from a twenty-four bit YUV value. The YUV information is received by frame buffer system 10 by way of YUV system input line 24 and applied to YUV to RGB conversion matrix 14. A YUV to RGB conversion taught by Lippincott in "Minimal YUV/RGB Conversion Logic", copending with the present application, may be used for the purpose of efficiently converting from the YUV standard to the RGB standard as required within conversion matrix 14. However, it will be understood that other kinds of matrices effective to convert from YUV standard to RGB standard may be used within buffer system 10.

Thus on RGB multiplexer input line 16 pixel multiplexer 18 receives three eight bit RGB digital values corresponding to signals from video system input line 12, and on RGB multiplexer input line 34 pixel interpolator 18 receives three eight bit RGB digital values corresponding to graphics system input line 28. These signals may be applied to pixel multiplexer 18 as two twenty-four bit words. A selected one of these two twenty-four bit words on RGB multiplexer input lines 16, 34 is applied to digital-to-analog converter 22 by pixel multiplexer 18. The three eight bit values applied to digital-to-analog converter 22 by pixel multiplexer 18 are converted into three analog signals resenting the red, green and blue components of an image. The analog signals of converter 22 are applied to system output line 24 for display on a conventional color monitor.

In prior art visual frame buffer system 10 the section of a twenty-four bit input from the two twenty-four bit inputs of RGB multiplexer input lines 16, 34 by pixel multiplexer 18 is controlled by key compare device 36. Chroma key compare device 36 receives the twenty-four bit RGB value of line 34 which includes the outputs of color lookup tables 32*a–c*. Compare device 36 makes a determination whether to display a video pixel received by way of system input line 12 or a graphics pixel received by way of system input line 28 according to this value received on line 34. Chroma key compare device 36 controls pixel multiplexer 18 to select either RGB multiplexer input line 16 or RGB multiplexer input line 34 according to the pixel determination.

Control of multiplexer 18 may be accomplished by pre-programming compare device 36. For example, control of pixel multiplexer 18 may be triggered by red, blue or green values from lookup tables 32*a–c* which are equal to zero or two hundred fifty six. Thus, for example, when a programmed value of such as zero is determined to be present on line 34 by compare device 36, compare device 36 may cause pixel multiplexer 18 to apply converted video information to system output line 24 rather than graphics information from lookup tables 32*a–c*. However when performing these operations prior art visual frame system provides only output pixels which are either entirely graphics or entirely video.

SUMMARY OF THE INVENTION

In the system of the present invention an individual displayed pixel is a weighted combination of a video pixel and a graphics pixel. For example, a pixel displayed on a monitor may be three-quarters graphics and one-quarter video. In this system a color lookup table providing a red, a green and a blue lookup table output value is extended to provide a further lookup table output value. The further lookup table output value is a weight value representative of the relative weights of a video pixel and a corresponding graphics pixel. The weight value is applied to a matrix multiplier which receives video pixel information and graphics pixel information. The matrix multiplier determines a weighted combination of the video and graphics pixel information according to the weight value to provide a blended pixel.

DETAILED DESCRIPTION OF THE INVENTION

Figure 1:
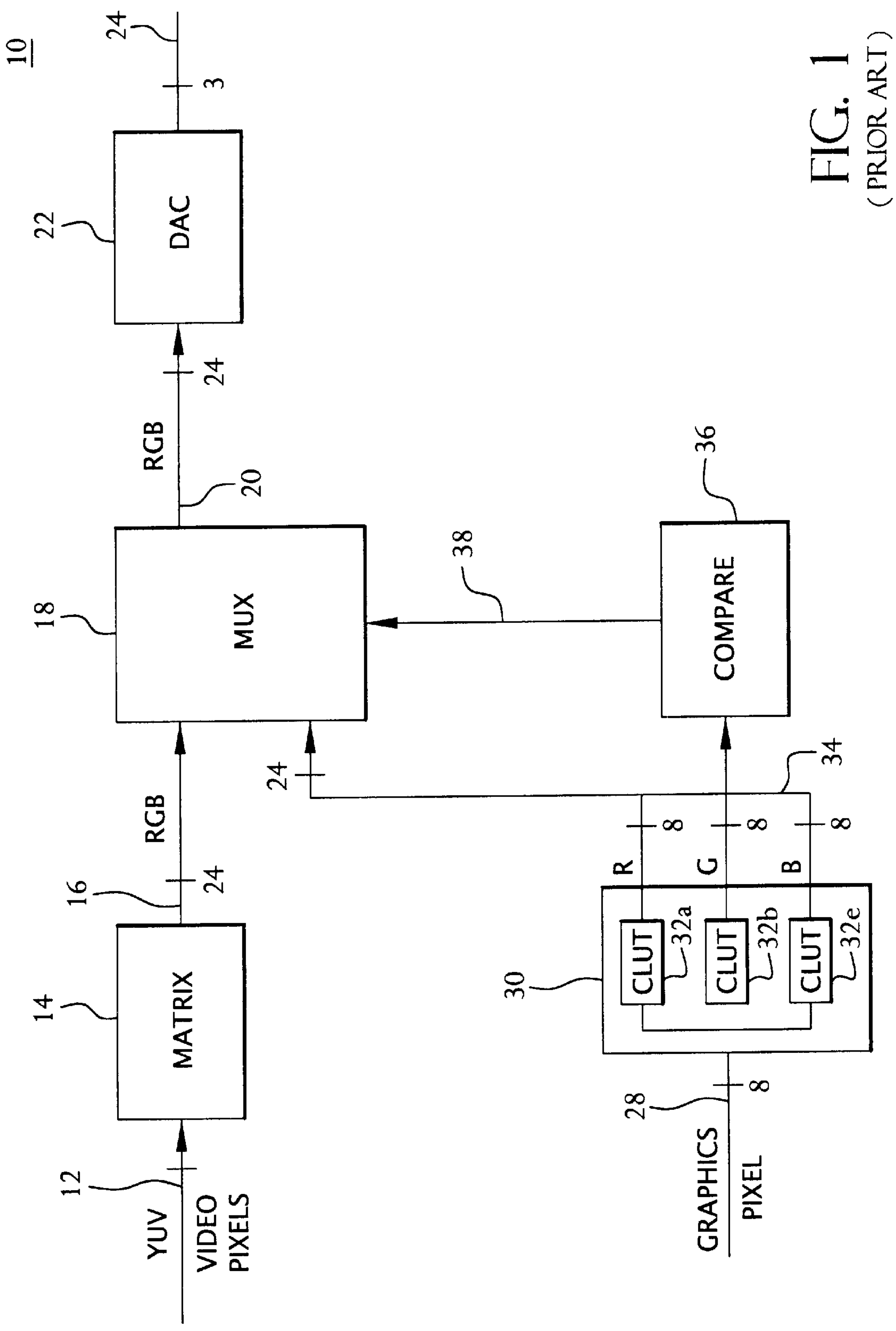
FIG. 1 (PRIOR ART)
FIG. 1 shows a block diagram representation of a prior art visual frame buffer system.
Figure 2:
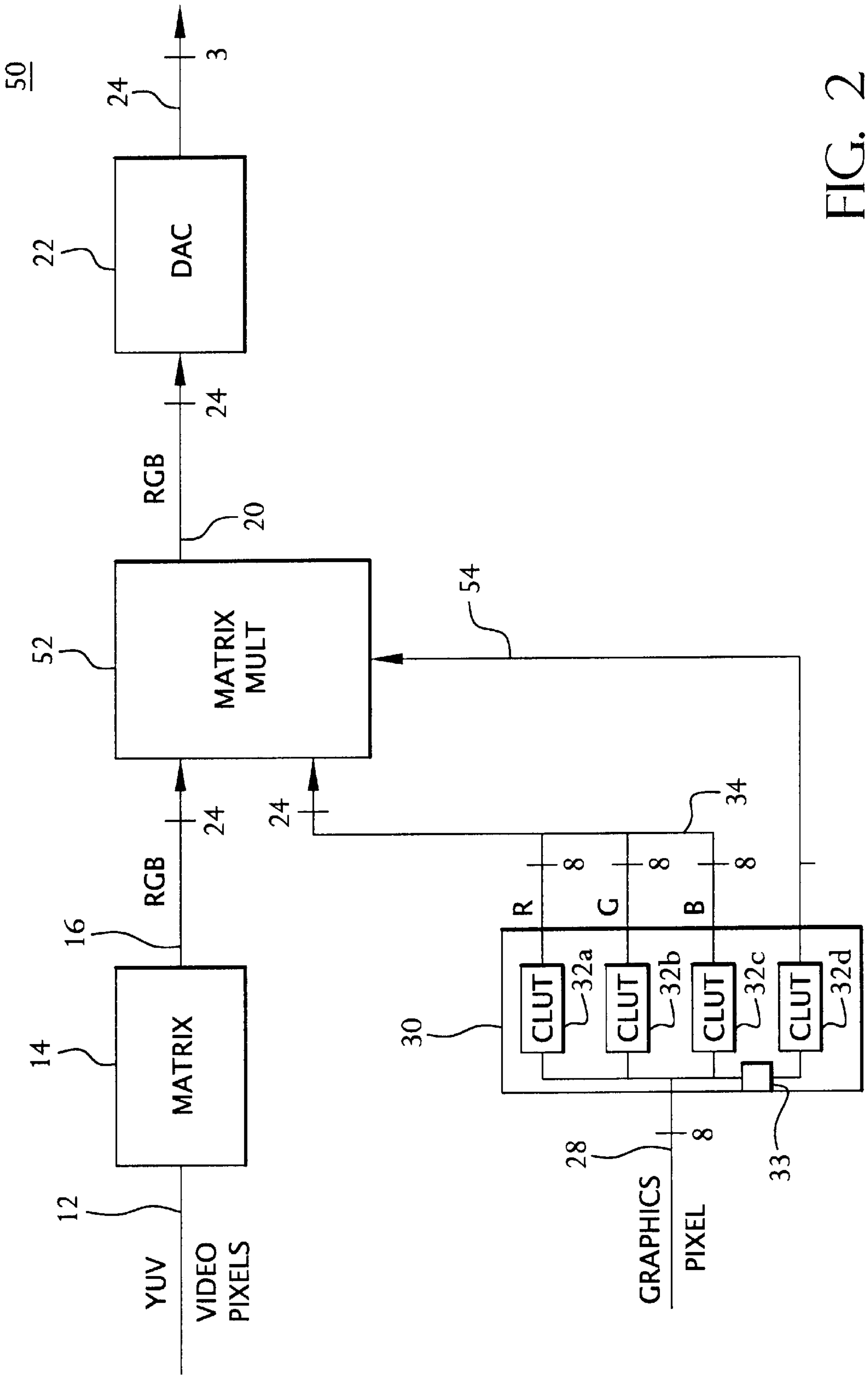
FIG. 2 shows the color lookup table blending system of the present invention.

Referring now to FIG. 2, there is shown color lookup table blending system 50. Color lookup table blending system 50 receives YUV standard video pixels and RGB standard graphics pixels and provides a programmable blending of the video and graphics pixels on a pixel by pixel basis.

YUV standard video pixels are received by lookup table blending system 50 by way of YUV video system input line 12. The input video signals are applied to conversion matrix 14 as previously described with respect to visual frame buffer system 10. Conversion matrix 14 converts the YUV standard input pixels of YUV system input line 12 to RGB standard input pixels and provides signals representative of the converted RGB standard pixels on matrix multiplexer input line 16. The RGB signals of matrix multiplexer input line 16 are applied to pixel blending matrix multiplier 52.

RGB standard graphics pixels are received by color lookup table blending system 50 by way of RGB graphics system input line 28 and applied to buffer system memory 30. Within buffer system memory 30, three color lookup tables 32*a–c* are provided for determining twenty-four bits of color information on matrix multiplexer input line 34. However, in color lookup table blending system 50, a fourth color lookup table 32*d* is provided within buffer system memory 30. A table output value is accessed from color lookup table 32*d* according to the input pixel of RGB system input line 28 in the same manner as that previously described with respect to color lookup tables 32*a–c*. The accessed value of color lookup table 32*d* is applied to pixel blending matrix multiplier 52 by way of matrix multiplier control line 54.

Pixel blending matrix multiplier 52 is a multiplication circuit effective to multiply the value of matrix multiplexer input line 16 by a multiplication factor and to multiply the value of matrix multiplexer input line 34 by a multiplication factor. The multiplication factors applied to the values of multiplexer input lines 16, 34 are determined using the eight bit control signal applied to matrix multiplier 52 by way of multiplier control line 54. Thus, by controlling the values on multiplier control line 54, and thereby controlling the multiplication factors applied to the values of input lines 16, 34, control lookup table blending system 50 blends the signals of lines 16, 34 according to the input value of graphics system input line 28.

It will be understood that multiplication by factors of one-half, one-quarter, and other reciprocal integer powers of two may be accomplished using only shift operations. It will also be understood that the multiplications performed within matrix multiplexer 52 may be limited to such reciprocal integer powers of two and that matrix multiplexer 52 may perform only shift operations and add operations.

Lookup table 32*d* of system memory 30 may be programmed to provide relative weighing between the values of RGB multiplexer input lines 16, 34 by storing in the locations of lookup table 32*d* control signals representative of the amount blending required. In this method the varying amounts of blending are determined and stored in accordance with predetermined values of graphics input pixels received on system input line 28. Thus, for example, a signal on system input line 28 corresponding to a zero component of red may access from color lookup table 32*d* a value which is effective, when applied to multiplier 52 by control line 54, to select a predetermined percent blending of lines 16, 34, for example, 25% and 75% respectively.

An example of a use of the blending method of the present invention is softening graphics fonts. When a video background is overlayed with graphics fonts there may be sharp transitions between the video display and the graphics display. This may produce an unpleasing appearance. It may be more pleasing to provide somewhat fuzzy edges on the graphics fonts. This is sometimes referred to as a soft font. This may be performed by blending from video to graphics at the edges of the transitions using lookup table blending system 50.

For example the monitor may display three-fourths video and one-fourth graphics in the immediate vicinity of the transition between background and font. This may change to one-half video and one-half graphics and then to three-fourths graphics and one-fourth video as the edge of the font is crossed. Finally the display may become entirely graphics. This method of softening a font, which provides a smooth and pleasing transition from video to graphics, may be achieved using blending system 50.

Another example of blending video and graphics is the following. A graphics car may be displayed over a video image of a forest scene. In this combination it is desirable to permit the video forest scene to partially show through selected window areas of the graphics car. This effect is not possible by simply selecting either a graphics pixel or a video pixel. Thus blending may provide a way to make images look more realistic graphics and video are mixed.

While this invention has been described with reference to a specific and particularly preferred embodiment thereof, it is not limited thereto and the appended claims are intended to be construed to encompass not only the specific forms and variants of the invention shown but to such other forms and variants as may be devised by those skilled in the art without departing from the true scope of the invention.

What is claimed is:

1. A video processing system for combining first and second input signals to provide a combined output signal, wherein the first input signal is representative of a first pixel and the second input signal is representative of a second pixel and a combining factor index, the system comprising:

(a) lookup table means for determining a combining factor in accordance with a table location accessed by the combining factor index of the second input signal;

(b) means for applying the first and second pixels and the combining factor to a blending circuit; and (c) the blending circuit, wherein the blending circuit is for combining the first and second pixels in accordance with the combining factor to provide the combined output signal.

2. The video processing system of claim 1, wherein the blending circuit is a pixel blending matrix multiplier circuit.

3. The video processing system of claim 1, wherein the blending circuit comprises means for providing a weighted sum of the first and second pixels in accordance with said combining factor.

4. The video processing system of claim 1, wherein the first pixel is a video pixel and the second pixel is a graphics pixel.

5. The video processing system of claim 1, further comprising:

(d) means for converting the first pixel from a YUV type pixel to an RGB type pixel before the first pixel is applied to the blending circuit;

wherein the lookup table means (a) comprises:

(a)(1) a plurality of lookup tables for converting the second pixel from a YUV type pixel to an RGB type pixel before the second pixel is applied to the blending circuit; and (a)(2) a lookup table for determining the combining factor in accordance with the table location accessed by the combining factor index of the second input signal.

6. The video processing system of claim 5, wherein:

means (d) comprises a conversion matrix circuit for converting the first pixel from a YUV type pixel to an RGB type pixel; and the plurality of lookup tables comprises three lookup tables.

7. The video processing system of claim 6, wherein the conversion matrix circuit comprises a second plurality of three lookup tables.

8. The video processing system of claim 6, wherein:

the blending circuit is a pixel blending matrix multiplier circuit; and the first pixel is a video pixel and the second pixel is a graphics pixel.

9. A video processing method for combining first and second input signals to provide a combined output signal, wherein the first input signal is representative of a first pixel and the second input signal is representative of a second pixel and a combining factor index, the method comprising the steps of:

(a) determining with a lookup table means a combining factor in accordance with a table location accessed by the combining factor index of the second input signal;

(b) applying the first and second input signals and the combining factor Co a blending circuit; and (c) combining with the blending circuit the first and second input signals in accordance with the combining factor to provide a combined output signal.

10. The video processing method of claim 9, wherein the blending circuit is a pixel blending matrix multiplier circuit.

11. The video processing method of claim 9, wherein the blending circuit comprises means for providing a weighted sum of the first and second pixels in accordance with said combining factor.

12. The video processing method of claim 9, wherein the first pixel is a video pixel and the second pixel is a graphics pixel.

13. The video processing method of claim 9, further comprising:

(d) converting the first pixel from a YUV type pixel to an RGB type pixel before the first pixel is applied to the blending circuit;

wherein the lookup table means comprises:

(1) a plurality of lookup tables for converting the second pixel from a YUV type pixel to an RGB type pixel before the second pixel is applied to the blending circuit; and (2) a lookup table for determining the combining factor in accordance with the table location accessed by the combining factor index of the second input signal.

14. The video processing method of claim 13, wherein:

the converting of step (d) utilizes a conversion matrix circuit for converting the first pixel from a YUV type pixel to an RGB type pixel; and the plurality of lookup tables comprises three lookup tables.

15. The video processing method of claim 14, wherein the conversion matrix circuit comprises a second plurality of three lookup tables.

16. The video processing method of claim 14, wherein:

the blending circuit is a pixel blending matrix multiplier circuit; and the first pixel is a video pixel and the second pixel is a graphics pixel.

17. A video processing system for combining first and second input signals to provide a combined output signal, wherein the first input signal is representative of a first pixel and the second input signal is representative of a second pixel and a combining factor index, the system comprising:

(a) a lookup table coupled to the second input signal, the lookup table having a plurality of table locations; and (b) a blending circuit coupled to the first and second input signals and to the lookup table, the blending circuit generating the combined output signal; wherein:

the lookup table determines a combining factor in accordance with a table location accessed by the combining factor index of the second input signal; and the blending circuit combines the first and second pixels in accordance with the combining factor to provide the combined output signal.

18. The video processing system of claim 17, wherein the blending circuit is a pixel blending matrix multiplier circuit.

19. The video processing system of claim 17, wherein the blending circuit provides a weighted sum of the first and second pixels in accordance with said combining factor.

20. The video processing system of claim 17, wherein the first pixel is a video pixel and the second pixel is a graphics pixel.

21. The video processing system of claim 17, further comprising:

(c) a YUV to RGB converter circuit coupled between the first input signal and the blending circuit;

wherein the lookup table comprises:

(a)(1) a second YUV to RGB converter circuit coupled between the second input signal and the blending circuit, the second YUV to RGB converter circuit comprising a plurality of lookup tables; and (a)(2) a combing factor lookup table coupled between the second input signal and the blending circuit, wherein the combining factor lookup table outputs the combining factor in accordance with the table location accessed by the second input signal.

22. The video processing system of claim 21, wherein:

the YUV to RGB converter circuit comprises a conversion matrix circuit; and the second YUV to RGB converter circuit comprising three lookup tables.

23. The video processing system of claim 22, wherein the conversion matrix circuit comprises three lookup tables.

24. The video processing system of claim 22, wherein:

the blending circuit is a pixel blending matrix multiplier circuit; and the first pixel is a video pixel and the second pixel is a graphics pixel.

25. A video processing system for combining first and second input signals to provide a combined output signal, the video processing system comprising:

(a) lookup table means, wherein the first input signal is representative of a first pixel and the second input signal is representative of a second pixel and a combining factor index, wherein the lookup table means is for determining a combining factor in accordance with a table location accessed by the combining factor index of the second input signal;

(b) a blending circuit for combining the first and second pixels in accordance with the combining factor to provide the combined output signal; and (c) means for applying the first and second pixels and the combining factor to the blending circuit;

wherein the lookup table means (a) comprises:

(a)(1) a plurality of lookup tables for converting the second pixel from a first type pixel to a second type pixel before the second pixel is applied to the blending circuit; and (a)(2) a lookup table for determining the combining factor in accordance with the table location accessed by the combining factor index of the second input signal.

26. The video processing system of claim 25, wherein:

the first type is a YUV type; and the second type is an RGB type.

27. The video processing system of claim 25, further comprising:

(d) means for converting the first pixel from the first type pixel to the second type pixel before the first pixel is applied to the blending circuit.

28. The video processing system of claim 27, wherein:

the first type is a YUV type; and the second type is an RGB type.

* * * * *